United States Patent [19]

Carter

[11] 3,869,572

[45] Mar. 4, 1975

[54] CHARGE COUPLED IMAGER

[75] Inventor: David L. Carter, Upper Montclair, N.J.

[73] Assignee: Texas Instruments Incorporated, Dallas, Tex.

[22] Filed: Nov. 9, 1973

[21] Appl. No.: 414,484

Related U.S. Application Data

[63] Continuation of Ser. No. 214,365, Dec. 30, 1971, abandoned.

[52] U.S. Cl. .................... 178/7.1, 357/24, 357/30, 357/32

[51] Int. Cl. .................... H04n 5/30

[58] Field of Search .................... 178/7.1; 357/24, 32

[56] References Cited

FOREIGN PATENTS OR APPLICATIONS 2,080,529 11/1971 France

OTHER PUBLICATIONS

"Systems and Technologies for Solid State Image Sensors," P. K. Weimer, pp. 258–259, Synopses of papers, 1971 IEEE International Conv., N.Y., 3/71.

"Charge-Coupled Devices. A New Approach to Misdevice Structures," Boyle et al., IEEE Spectrum, pp. 18–27, 7/71.

"Self-Scanned Image Sensors Based on Charge Transfer by the Bucket Brigade Method," IEEE Trans. Electron Devices, Weimer et al., pp. 996–1003, 11/71.

*Primary Examiner*—Robert L. Griffin
*Assistant Examiner*—George G. Stellar
*Attorney, Agent, or Firm*—Harold Levine; James T. Comfort; Gary C. Honeycutt

[57] ABSTRACT

Disclosed is an improved charge coupled optical imager and method of fabrication which includes a multilayer metallization system for addressing respective rows of the imager and for applying multiphase clocks to the respective electrodes of the charge coupled devices. The imager requires only two clock sources and substantially reduces the required semiconductor surface area required for a resolution element. In a preferred embodiment, anodized aluminum is used as the insulation separating the first and second levels of metallization.

5 Claims, 4 Drawing Figures

CHARGE COUPLED IMAGER

This is a continuation of application Ser. No. 214,365, filed Dec. 30, 1971, now abandoned.

The present invention pertains to optical imagers in general and more particularly to an improved charge coupled optical imager which includes a multilevel metallization system for addressing the imager, and method of fabrication.

Charge-coupled devices are metal-insulator-semiconductor devices which belong to a general class of semiconductor charge devices which store and transfer information in the form of electrical charge. The charge coupled devices are distinguished by the property that the semiconductor portion of the devices is, for the most part, homogeneously doped, regions of different conductivity being required only for injecting or extracting charge. A typical semiconductor charge-coupled device shift register is described, for example, in Boyle, et al, Bell System Technical Journal 49, 587 (1970). In the shift register, a DC bias sufficient to invert the semiconductor surface is applied between electrodes, and the semiconductor material, and clocking pulses are applied sequentially to the electrodes. Because of the inversion, semiconductor surface minority carriers are drawn to the semiconductor-insulator interface and tend to collect in the potential wells under the electrodes. When the clocking pulses are sufficiently large, the minority carrier migrate from the area under one electrode to the area under the next following a potential well produced by the clocking pulses.

The charge coupled devices may advantageously be utilized as an optical imager. Bertram, "Application of the Charge Coupled Device Concept to Solid State Image Sensors" 1971 IEEE International Convention, March 22 – 25, New York, N. Y., describes such a charge coupled imager which includes an optical integration section and a separate storage section. For cameras having a large number of picture elements, an excessive amount of surface area of semiconductor material is required due to the separate sections of the camera. Also, a large area camera requires a relatively fast clock rate which reduces the charge transfer efficiency.

Accordingly, an object of the present invention is to produce an improved charge-coupled imager.

A further object of the invention is to provide a charge-coupled imager having a multilevel metallization system for addressing the imager.

An additional object of the invention is the provision of a method for fabricating the screen of an optical imager utilizing multilevel metallization techniques.

Briefly in accordance with the present invention, a compact optical imager is formed on a semiconductor substrate. A relatively thin insulating layer is formed over one surface of the substrate, and a first metallization layer is defined over the thin insulating layer. The metallization layer is patterned to define a plurality of semiconductor parallel, spaced apart electrodes which in combination with the semicondutor material and the thin insulating layer define a charge-coupled shift register. A second relatively thick insulating layer is formed over the first metallization, and a plurality of apertures are opened through this insulating layer to selectively expose electrodes of the charge-coupled shift register. A second level of metallization is then formed to define a plurality of substantially parallel conductive strips which selectively extend through the apertures to ohmically contact the electrodes. These conductive strips are the contact leads for the multiphase clocks required to operate the shift register. This multilevel metallization technique advantageously reduces the amount of semiconductor surface area required for the optical imager.

In accordance with an illustrative embodiment of the invention, a charge-coupled imager system comprises a plurality of rows of optically active, substantially parallel charge-coupled shift registers defined over one surface of a semiconductor substrate. The shift registers respectively comprise a multilevel metallization system. Switching means are included for coupling the conductive strips which ohmically contact respective electrodes of the shift register to a multiphase clock source. Scan means are operably connected to the switching means for selectively addressing respective rows of the optically active charge coupled registers. Output means are provided for detecting the electrical charge resulting from the image detected by the respective bits of the charge coupled shift register.

In accordance with a different aspect of the invention, a method is provided for fabricating an imager screen which includes the steps of forming a relatively thin insulating layer over one surface of a semiconductor substrate; forming a first layer of metal over the insulating layer and patterning this layer to define a plurality of spaced apart, elongated substantially parallel electrodes. A second relatively thick insulating layer is then formed over the electrodes. Apertures are opened through the second insulating layer to selectively expose the electrodes, and then a second layer of metal is formed over the second insulating layer. The second layer of metal extends through the apertures and ohmically contacts the electrodes. The second layer of metal is then patterned to form a plurality of substantially parallel strips which extend substantially orthogonal to the elongated electrodes.

In accordance with a particular feature of the invention, the insulating layer separating the two levels of metallization comprises anodized aluminum.

Other objects, advantages and novel features of the present invention will become apparent upon reading the following detailed description of illustrative embodiments of the invention in conjunction with the drawings wherein.

Figure 1:
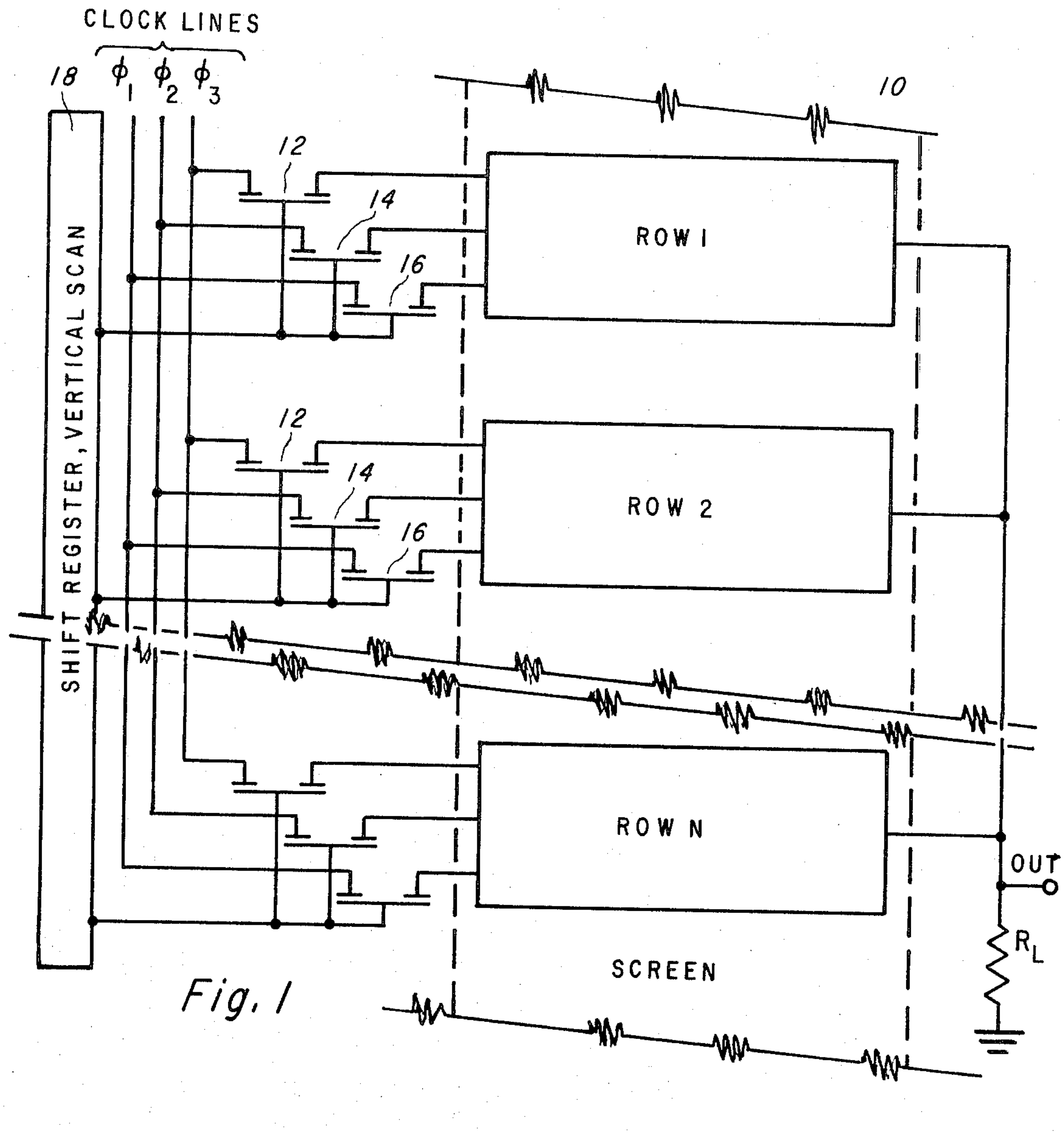
FIG. 1 is a schematic and block diagram illustration of an imager system in accordance with the present invention.

With reference to FIG. 1 there is illustrated an optical imager system in accordance with one embodiment of the present invention. The imager system includes an optically active action region or screen 10. This screen is comprised of a plurality of optically active regions disposed in horizontal rows labeled row 1, row 2 . . . row *n*. As will be explained in greater detail hereinafter, each row of the screen 10 comprises a multiphase charge coupled shift register. A two level metallization system is advantageously utilized to minimize surface area of semiconductor material required for the screen 10. Output means labeled $R_L$ are coupled to each row of the imager screen 10. As understood by those skilled in the art, the output of a charge coupled shift register may be detected through ohmic contact to a p-n junction region (not shown) formed in the surface region of the substrate.

A three-phase, charge-coupled shift register embodiment is illustrated in FIG. 1 and the multiphase clocks $\phi_1$, $\phi_2$ and $\phi_3$ are coupled to respective rows of the imager's screen 10 via insulated gate field effect transistor switching devices illustrated generally at 12, 14 and 16. Transistor 16 couples $\phi_1$ of the clocks to the charge coupled shift register while transistors 14 and 12 respectively couple clocks $\phi_2$ and $\phi_3$. The switching transistors 12, 14, and 16 are energized by vertical scan means shown in block diagram at 18. When it is desired to read information, for example, from row 1, the vertical scan means 18 provides a signal to the gates of transistors 12, 14 and 16, driving these transistors into conduction and enabling clock pulses $\phi_1$, $\phi_2$ and $\phi_3$ to be applied to the charge coupled shift register defining row 1 of the imager. In accordance with the preferred embodiment of the present invention, the vertical scan means comprises a bucket-brigade shift register configuration of insulated gate field effect transistors. Such a shift register is described in more detail with reference to FIG. 4.

Figure 3:
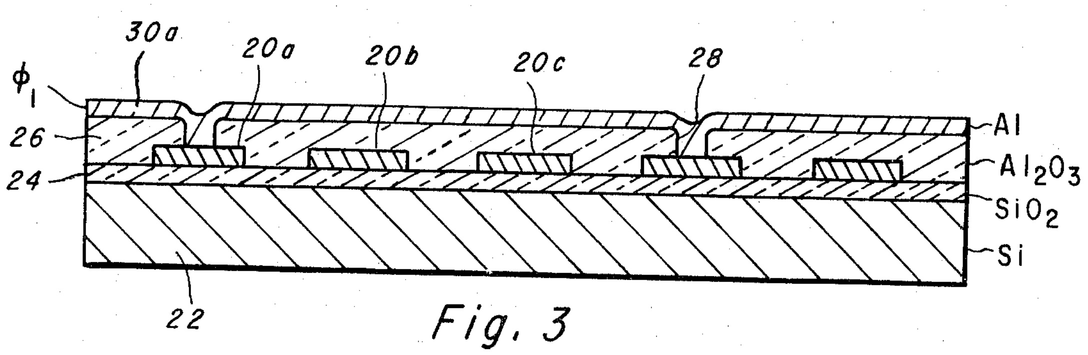
FIG. 3 is a cross section view along the line 3–3 of FIG. 2.
Figure 2:
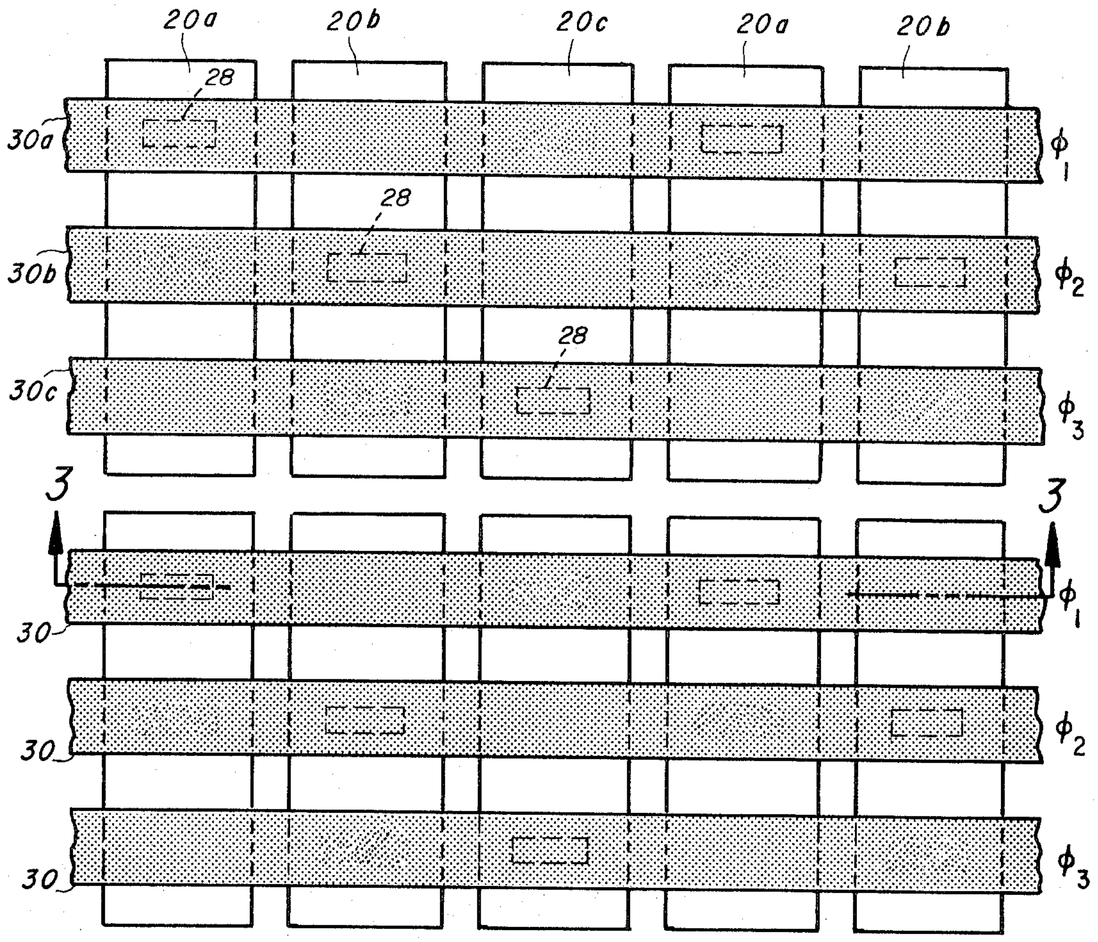
FIG. 2 is a plan view illustrating two rows of the imager illustrated in FIG. 1 showing the two-level metallization system of the present invention.

With reference to FIGS. 2 and 3, portions of two rows of the imager screen 10 are illustrated. For the three-phase shift register embodiment illustrated, a set of three electrodes such as 20*a*, 20*b*, and 20*c* defines one bit of the charge coupled shift register and correspondingly, one resolution element of the imager. The electrodes 20*a*, 20*b*, and 20*c* are formed on a semiconductor substrate 22 and are separated therefrom by a relatively thin insulating layer 24. Preferably the substrate is *n*-type silicon, and the insulating layer 24 is silicon oxide formed to a thickness of about 1,000 A. Other insulating materials such as silicon nitride could also be used. Also other semiconductor materials may be utilized if desired. A first level metallization is formed over the insulating layer 24, and this level is patterned by conventional techniques such as photolithographic masking and etching to provide a plurality of elongated, spaced apart substantially parallel electrodes 20*a*, 20*b*, and 20*c*. These electrodes are then covered with a relatively thick insulating layer 26 which may, by way of example, comprise silicon oxide formed to a thickness on the order of 10,000 A. Also the layer 26 may advantageously be formed of anodized aluminum. Techniques for anodizing aluminum to form insulating layers are described in more detail in co-pending application, Ser. No. 130,358, filed Apr. 1, 1971, now U.S. Pat. No. 3,756,924 issued Sept. 4, 1973.

Apertures 28 are opened in the insulating layer 26 to expose selected ones of the electrodes 20*a*, 20*b*, and 20*c*. A second level of metallization is formed over the insulating layer 26 and extends through the apertures 28 into ohmic contact with the electrodes 20. Preferably this metallization comprises aluminum. This layer may be patterned to form substantially parallel conductive strips 30*a*, 30*b*, and 30*c*. These conductive strips lie in a direction substantially perpendicular to the length of the elongated electrodes 20*a*, 20*b*, and 20*c*, as may be seen most clearly in FIG. 2. The conductive strips 30*a*, 30*b*, and 30*c* form the leads for the multiphase clocks $\phi_1$, $\phi_2$, and $\phi_3$ for the three phase embodiment illustrated. As may be seen, for example, with reference to the conductive strip 30*a* to which the multiphase clock $\phi_1$ is applied, ohmic contact is made only to electrodes 20*a* through the apertures 28. Similarly with respect to the conductive strip 30 *b*, ohmic contact is made only to electrodes 20*b*; while with respect to conductive strip 30*c*, ohmic contact is made to electrodes 20*c*. This structure advantageously reduces the surface area required of the substrate 22.

Using drive lines 30*a*, 30*b*, and 30*c*, dimensioned in accordance with design rules which require 0.4 mills for line width and 0.4 mills for spaces between metal lines, the minimum dimensions of one cell, i.e., resolution element, of the imager is 2.8 × 2.8 mills or 70 microns on a side, assuming that the horizontal spacing between charge coupled device electrodes such as 20*a* and 20*b* is approximately 0.1 mills. This enables a resolution on the order of 357 lines per inch.

The respective rows of the imager are read out horizontally in charge-coupled device shift register fashion via the application of appropriate drive voltages on the metal drive lines $\phi_1$, $\phi_2$, and $\phi_3$ which are ohmically connected through the apertures in the second level of insulation 26 to the charge-coupled device electrodes 20*a*, 20*b* and 20*c*. It may thus be seen that an imager is provided which does not require a storage section and which requires only two different sets of clocks; one set of clocks for the vertical scan generator 18 (FIG. 1), and another set of clocks for the horizontal charge-coupled device shift register.

Figure 4:
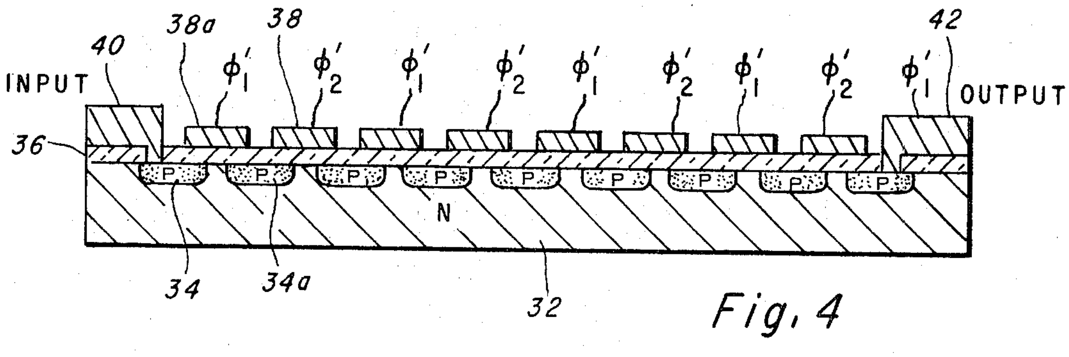
FIG. 4 is a cross section view of a bucket-brigade configuration of insulated gate field effect transistors which may be utilized for the vertical scan shift register of FIG. 1.

With reference to FIG. 4, there is illustrated in cross section a bucket-brigade insulated gate field effect transistor shift register which may be utilized for the vertical scan shift register 18 of FIG. 1. By way of example, the shift register may be formed on an n-type silicon substrate 32. Pockets of opposite conductivity type material 34 respectively form the source and drain regions of the insulated gate field effect transistors. These pockets of opposite conductivity type may be formed by conventional techniques such as diffusion or ion implantation. A relatively thin insulating layer 36 of, for example, silicon dioxide having a thickness of about 1,000 A is formed over the substrate 32 and pockets 34 of opposite conductivity type. Conductive electrodes 38 are formed over the insulating layer. As may be seen, the electrodes, such as 38*a* extend over a greater portion of the diffused region 34*a* than is normal in insulated gate field effect transistor devices. This is to enhance the miller capacitance and facilitate storage of charge in the bucket-brigade shift register. A two-phase clock shown generally as $\phi'_1$ and $\phi'_2$ is applied to successive gate electrodes of the bucket-brigade configuration. As understood by those skilled in the art, information in the form of electrical charge is generally stored only in every other bucket of the brigade. Input information to the shift register may be clocked in via the ohmic contact lead illustrated at 40, and information may be clocked out of the shift register via the ohmic contact lead 42.

Parallel taps to respective bits of the bucket-brigade shift register illustrated in FIG. 4 ohmically connect these bits to the gates of switching transistors such as 12, 14 and 16 illustrated in FIG. 1. This high impedance tap to the gate electrode of the insulated gate field effect transistor does not substantially affect the charge being shifted along the shift register. This tap may be effected by an ohmic contact to the diffused region such as 34*a* in FIG. 4.

While the two-level metallization system has been described above with respect to the three-phase system, it is to be understood that other multiphase charge-coupled shift register systems may be utilized. In addition, the electrodes themselves of the shift register may be formed in a two-level metallization technique such as described in the aforementioned U.S. Pat. No. 3,756,924 and a third metallization level utilized to connect to the respective electrodes as described in accordance with the present invention. Further while the illustrative embodiments have pertained to imagers, it will be appreciated that the multilevel metallization techniques may be utilized for a variety of applications requiring compact structures. Accordingly, it will be appreciated by those skilled in the art that various modifications may be made without departing from the scope or spirit of the invention.

What is claimed is:

1. An optical imager system comprising:

a semiconductor substrate having a surface of insulating material, a plurality of rows of optically active, substantially parallel first regions in said substrate respectively defining a charge transfer shift register device corresponding to each row, each of said charge transfer shift register devices cooperating to form a first metallization level disposed over said insulating suface of said substrate and providing a plurality of substantially parallel spaced apart electrodes, sets of at least two successive electrodes cooperating to define respective bits of each said charge transfer shift register device, an insulating layer disposed over said first level metallization and filling the spaces between adjacent electrodes, said insulating layer being provided with a plurality of apertures selectively exposing predetermined electrodes, a second level of metallization defining a plurality of substantially parallel conductive strips overlying said insulating layer and extending through said apertures therein to selectively ohmically contact said electrodes, said plurality of conductive strips being arranged in sets of conductive strips corresponding to respective charge transfer shift register devices, a multiphase clock source, said multiphase clock source being provided with a plurality of clock lines for transmitting different phase pulses, each of which is arranged for respective connection to each of the charge transfer shift register devices comprising the plurality of rows of said first regions in said substrate, switching means interposed between each of said plurality of clock lines and the respective charge transfer shift register devices and operable to connect said plurality of conductive strips to said plurality of clock lines in a predetermined sequence to thereby couple said charge transfer shift register devices to the respective clock lines, scanning means operably connected to said switching means for selectively addressing respective charge transfer shift register devices corresponding to respective rows of said optically active first regions of said substrate, and output means for detecting electrical charge resulting from the image detected by respective bits of said charge transfer shift register devices.

2. An optical imager system as set forth in claim 1, wherein said substrate is silicon having a thin layer of silicon oxide thereon defining said surface of insulating material, and said insulating layer comprises anodized aluminum.

3. An optical imager system as set forth in claim 1, wherein said switching means comprises a plurality of insulated gate field effect transistors having source and drain electrodes with an insulated gate electrode extending therebetween defined in a second region of said substrate, and the source and drain electrodes of each said field effect transistor respectively coupling the plurality of clock lines of said multiphase clock source to respective ones of said plurality of conductive strips.

4. An optical imager system as set forth in claim 3, further including a second multiphase clock source, said scanning means comprising a plurality of insulated gate field effect transistors defined in a third region of said substrate in a bucket-brigade configuration, respective bits of said bucket-brigade configuration being ohmically connected to the gate electrodes of said field effect transistors comprising said switching means, and the respective gates of said field effect transistors comprising said scanning means being connected to said second multiphase clock source.

5. An optical imager system as set forth in claim 1, wherein each set of successive electrodes included in each said charge transfer shift register device comprises three electrodes which define one bit of said charge transfer shift register device, each set of conductive strips corresponding to respective charge transfer shift register devices comprises three conductive strips with each conductive strip in a set ohmically contacting every third electrode in a staggered relation to the other two conductive strips included in the same set, and said multiphase clock source comprises a three-phase clock source.

* * * * *